(12) United States Patent
Williams et al.

(10) Patent No.: US 11,840,327 B2
(45) Date of Patent: Dec. 12, 2023

(54) BI-DIRECTIONAL COANDA VALVE

(71) Applicants: David R. Williams, Chicago, IL (US); William C. Nicholson, Chicago, IL (US)

(72) Inventors: David R. Williams, Chicago, IL (US); William C. Nicholson, Chicago, IL (US)

(73) Assignee: ILLINOIS INSTITUTE OF TECHNOLOGY, Chicago, IL (US)

( * ) Notice: Subject to any disclaimer, the term of this patent is extended or adjusted under 35 U.S.C. 154(b) by 19 days.

(21) Appl. No.: 17/573,830

(22) Filed: Jan. 12, 2022

(65) Prior Publication Data

US 2023/0058987 A1    Feb. 23, 2023

Related U.S. Application Data

(60) Provisional application No. 63/284,141, filed on Nov. 30, 2021, provisional application No. 63/235,770, filed on Aug. 22, 2021.

(51) Int. Cl.
*B64C 21/04* (2023.01)
*F15D 1/08* (2006.01)

(52) U.S. Cl.
CPC ............. *B64C 21/04* (2013.01); *F15D 1/08* (2013.01)

(58) Field of Classification Search
CPC .......... B64C 9/38; B64C 15/14; B64C 21/08; B64C 3/141; B64C 21/04; F15D 1/08
See application file for complete search history.

(56) References Cited

U.S. PATENT DOCUMENTS 2,885,160 A * 5/1959 Griswold, II ........... B64C 3/141
                                                  244/207
2,939,650 A * 6/1960 Coanda .................. B64C 23/00
                                                  415/914

(Continued)

FOREIGN PATENT DOCUMENTS

| GB | 869065 A | 5/1961 |
|---|---|---|
| JP | S491436 B1 | 1/1974 |
| WO | WO 2008/029095 A1 | 3/2008 |

OTHER PUBLICATIONS

European Patent Office, English language verison of the European Search Report, for European Patent Application EP22191539.0, Dec. 14, 2022 (07 pages).

(Continued)

*Primary Examiner* — Richard Green
*Assistant Examiner* — Madison Elizabeth Dittner
(74) *Attorney, Agent, or Firm* — Pauley Erickson & Swanson

(57) ABSTRACT

A Coanda system for controlling directions of an aircraft. The system includes a fluid passage defined in part by a casing wall having an inner surface facing the fluid passage. The fluid passage is configured to pass fluid from a first end inlet to a second end outlet. A fluid control element including a Coanda surface is disposed at the second end outlet. The fluid control element is moveable within the second end outlet to direct the fluid exiting the fluid passage between an upper gap and a lower gap, around the Coanda surface. A contour element is disposed on the inner surface of the casing wall upstream of the fluid control element, and further assists in directing the fluid to the open gap.

20 Claims, 11 Drawing Sheets

(56) References Cited

U.S. PATENT DOCUMENTS

| | | | | |
|---|---|---|---|---|
| 3,605,780 | A * | 9/1971 | Kranz | F15C 1/04 |
| | | | | 137/875 |
| 3,754,576 | A * | 8/1973 | Zetterstrom | F15C 1/14 |
| | | | | 137/829 |
| 3,887,146 | A * | 6/1975 | Bright | B64C 29/00 |
| | | | | 244/207 |
| 4,388,950 | A * | 6/1983 | Stouffer | F24F 11/89 |
| | | | | 137/829 |
| 4,682,746 | A | 7/1987 | Thomas | |
| 4,807,665 | A * | 2/1989 | Schiel | F16K 11/0525 |
| | | | | 137/875 |
| 6,059,652 | A * | 5/2000 | Terry | B60H 1/3435 |
| | | | | 454/316 |
| 7,273,062 | B1 * | 9/2007 | Stender, Jr. | F16K 17/32 |
| | | | | 137/460 |
| 7,290,738 | B1 * | 11/2007 | Rogers | B64C 9/38 |
| | | | | 244/203 |
| 7,984,879 | B2 * | 7/2011 | Cook | B64C 9/38 |
| | | | | 244/211 |
| 9,032,721 | B2 * | 5/2015 | Orosa | F02K 1/38 |
| | | | | 60/395 |
| 11,072,423 | B1 * | 7/2021 | Robertson | B64C 27/22 |
| 2014/0191059 | A1 * | 7/2014 | Baffigi | F23D 14/84 |
| | | | | 239/11 |
| 2015/0132130 | A1 | 5/2015 | Brown | |

OTHER PUBLICATIONS

Clyde Warsop et al. "NATO AVT-239: Task Group:Supercritical Coanda based Circulation Control and Fluidic Thrust Vectoring" AIAA Scitech Forum, Jan. 7-11, 2019, (25 pages).

Clyde Warsop et al. "NATO AVT-239: Flight Demonstration of Fluidic Flight Controls on the MAGMA Subscale Demonstrator Aircraft" AIAA Scitech Forum, Jan. 7-11, 2019, (20 pages).

* cited by examiner

US 11,840,327 B2

BI-DIRECTIONAL COANDA VALVE

CROSS REFERENCE TO RELATED APPLICATIONS

This application claims the benefit of each of: U.S. Provisional Patent Application Ser. No. 63/235,770, filed on 22 Aug. 2021, and U.S. Provisional Patent Application Ser. No. 63/284,141, filed on 30 Nov. 2021. The co-pending provisional patent applications are hereby incorporated by reference herein in their entirety and are made a part hereof, including but not limited to those portions which specifically appear hereinafter.

STATEMENT REGARDING FEDERALLY SPONSORED RESEARCH

This invention was made with government support under N00014-19-1-2280 awarded by Office of Naval Research. The government has certain rights in the invention.

FIELD OF THE INVENTION

The present invention relates in general to the field of fluid direction control, and more particularly, to an apparatus, a system, and a method of using a Coanda valve to control the direction of moments produced on aircraft during flight.

BACKGROUND OF THE INVENTION

Air or water exiting from a jet placed close to a curved surface will follow the curvature of the surface, which is known as the Coanda effect. The Coanda effect causes the direction of the jet force to change. The change in direction of this force can be used to control the pitch and roll attitude of aircraft. Normally, the Coanda effect acts in only one direction.

Some known background technology related to this invention includes a control force generator for generating the aerodynamic lift, developed by Lockheed Corporation in the 1980s. That technology requires an external valve to operate the device. Other similar technology includes using a simpler Coanda device by BAE systems for flight control effectors on the MAGMA aircraft. They use a pair of devices to get the up/down control.

There have been issues in adopting Coanda devices in aircraft, such as due to slow response time and/or fluid leakage, in addition to other issues. Thus there is a continuing desire for improvements in such technology for flight control.

SUMMARY OF THE INVENTION

The present invention provides improved Coanda valves, such as for use in flight controls, for example, when placed at the trailing end of an aircraft wing.

Compared to known technologies, embodiments of the present invention eliminate the need for redundant valves, and provide a continuously variable control and a faster time response than a control effector with an external valve. Embodiments of this invention can be used as a control effector on aircraft, such as those that require control at low takeoff and landing speeds, or during flight in high angle of attack regimes where conventional control effectors do not work. For aircraft that have low observability requirements, the invention can be used to replace conventional control effectors during normal flight conditions. This invention is also different because it does not require any external valves to function.

The present invention provides a Coanda valve system and the methods of using such system for controlling of the direction of the fluid exiting from the valve system. The invention further provides the apparatus and methods for using the Coanda valve to control the direction of moments produced on aircraft during flight. Advantages of the invention include minimizing the time required for changing directions of the aircraft and producing a fast control response with a pneumatic control system for aircrafts. Embodiments of this invention provide a continuously variable control for changing the fluid direction and eliminates the need for any redundant valves to be used.

The invention includes a Coanda valve system using a movable Coanda surface to continuously change the direction of the fluid flow exists from the valve. Embodiments of the invention include a casing directing fluid to a fluid control ("Coanda") surface. The casing has inlet and outlet openings for distributing fluid passing through a casing plenum from one end to another end (inlet to exit). A fluid control element is located at the exit end of the casing with a movable Coanda surface, generally facing outward from the exit outlet.

In embodiments of this invention, the fluid control element has an inner portion facing the fluid inlet and outer portion, including the Coanda surface, facing outward. The inner portion can be wedge-shaped and inserted into the exit end of casing. The shape and size of the Coanda surface can be designed differently according to different designs of aircraft models. The Coanda surface can be continuously rotated to change the directions of the flow from the exit of the casing.

Embodiments of the invention further include a rotation part connecting to the control surface to rotate the Coanda surface clockwise and/or counter-clockwise. The example of the rotation part is a pin inserted through the fluid control surface. A first gap is formed between the top of the fluid control surface and the inner wall of the casing when the Coanda surface is rotated clockwise and a second gap is formed between the bottom of the fluid control surface and the inner wall of the casing when it is rotated counter-clockwise. The rotation part can rotate the Coanda surface continuously and control the direction of the fluid existing from the casing.

In some embodiments of the invention, the Coanda surface stays neutral when it is not rotated. The inner portion of the fluid control surface that is inserted into the casing seals the exit end of the casing completely while no fluid exiting from the casing.

In some embodiments of the invention, the Coanda surface stays neutral when it is not rotated while a first gap between the top of the fluid control surface and the inner wall of the casing and a second gap between the bottom of the fluid control surface and the inner wall of the casing are equally formed. In this case, the inner portion of the fluid control surface that is inserted into the casing does not seal the exit end of the casing. The fluid exits equally from the first gap and the second gap when the Coanda surface stays neutral.

In some embodiments of the invention, the casing can be positioned at the trailing edge of the aircraft's wings to allow for controlling the aerodynamic lift, aerodynamic drag, roll moment, pitch moment, and yaw moment. By locating the casing at the trailing edge of the wing, the latency time required for the valve to produce a change in the aerodynamic forces acting on the wing is minimized.

In some embodiments of the invention, the casing can be positioned near the nose of the aircraft to allow for left and/or right yaw control of the aircraft. Left/right yaw control could be achieved by blowing air over the left or right side of the nose of the aircraft.

Embodiments of the invention can be used to augment conventional control effectors, such as, flaps, ailerons, or elevons. Embodiments of the invention can also be used to completely replace conventional control effectors for aircrafts.

Embodiments of the invention further include a method for controlling direction of fluid with a movable Coanda surface. The method includes: injecting fluid from a first opening to a second opening positioned inside or outside of the aircraft, wherein the opening and closing of the second opening is controlled by rotation of a valve with a Coanda surface, wherein the fluid exits through the second opening along the Coanda surface when the second opening is open; injecting fluid from the first opening to a third opening positioned in the opposite direction of the second opening, wherein the opening and closing of the third opening is controlled by rotation of the valve with a Coanda surface, wherein the fluid exits through the third opening along the Coanda surface when the third opening is open; and rotating the valve to control the opening and closing of the second and the third opening. When the valve rotates clockwise, the second opening opens and the third opening closes, the fluid exits only from the second opening and flow along the Coanda surface. when the valve rotates counter-clockwise, the second opening closes and the third opening opens, the fluid exits only from the third opening and flow along the Coanda surface.

In some embodiments, the valve stays neutral and not rotated, the second and the third opening stay open at the same time and the fluid exits equally from the second and the third opening. In some other embodiments, when the valve stays neutral and not rotated, the second and the third opening stay closed and no fluid exits from said openings.

Current Coanda valve efforts have not been shown to have sufficient reliability for aircraft applications. A reliable Coanda effect generally breaks down when system pressures are increased to values required for flight control. The Coanda effect breaks down or even reverses direction at random locations across the exit of the Coanda control effector. A cause of the poor performance can be traced to flow from leaking across the nominally "closed" side of the Coanda exit. The leakage flow is opposite in direction to the desired Coanda flow so the leakage disrupts the Coanda effect. To solve this problem, embodiments of this invention incorporate a new internal structure that converts the rotating Coanda surface into a valve to prevent the leakage flow from occurring. In embodiments of this invention, a bi-directional Coanda valve include an upper and lower surface where continuous fluid flows from a fluid source to either one or both Coanda effect circulation control ports.

The fluid control surface, which is rotatably mounted for movement about its longitudinal axis, desirably includes a partial cylinder with a wedge or other shaped extension that are placed adjacent to the fluid discharge outlet. A rotation of the fluid control surface about the center of cylinder creates a seal along the wedge and a valve lip, effectively closing one fluid valve gap and directing fluid flow through the other valve gap. The shape of the valve entrance conforms to the shape of the wedge when either fluid valve seat is shut, which adequately creates several contact points for a complete seal and a smooth flow path through the opposing open fluid valve. A streamline curvature at the junction between the valve seat and Coanda cylinder produces a low pressure that prevents flow from exiting in the incorrect direction. Without several contact points along the seal, compressed fluid causes a break in the seal, which results in loss of control over the equivalent control angle. This effect is pronounced with smaller trailing edges and longer fluid control surfaces, both of which are necessary features for the use as an active flow control actuator on any trailing edges of an airfoil.

The invention further includes a Coanda valve system, such as for controlling directions of an aircraft. The system includes a fluid passage defined in part by a casing wall having an inner surface facing the fluid passage, the fluid passage configured to pass fluid from a first end inlet to a second end outlet. The system further includes a fluid control element including a Coanda surface disposed at the second end outlet, the fluid control element moveable within the second end outlet to direct the fluid exiting the fluid passage. The system also includes a contour element disposed on the inner surface of the casing wall upstream of the fluid control element. In embodiments of this invention, the contour element is configured to work in combination with the inner portion of the fluid control element to direct the fluid over the Coanda surface. A second contour element can be disposed on an opposite side of the fluid passage from the contour element.

In embodiments of this invention, the fluid control element includes an inner portion within the fluid passage and facing the first end inlet. The contour includes a blocking wall facing the fluid control element, and the inner portion is moveable to position an end of the inner portion behind the blocking wall. The blocking wall desirably extends between a first diameter of the fluid passage and a greater second diameter of the fluid passage.

In embodiments of this invention, the contour element extends into the fluid passage. The contour element desirably includes a sloped surface facing the first end inlet.

The invention further includes a Coanda valve system with a fluid control element extending across a second end outlet of an air flow casing, and moveable within the second end outlet to direct the fluid exiting the fluid passage. The fluid control element includes a Coanda surface at the second end outlet, and an inner portion extension within the fluid passage and facing the first end inlet. A first contour element is disposed on a first inner surface of the casing, upstream of the fluid control element, and a second contour element is disposed on a second inner surface of the casing, upstream of the fluid control element and opposite the first contour element. The fluid control element is rotatable within the second end outlet between a first position and a second position, wherein in the first position the inner portion of the fluid control element is disposed downstream of the first contour element, and in the second position the inner portion of the fluid control element is disposed downstream of the second contour element. Each of the first and second contour elements includes or provides a blocking wall facing the fluid control element, and the inner portion is moveable to position an end of the inner portion behind the blocking wall.

The rotation mechanism is connected to the fluid control element and configured to rotate the fluid control element about a longitudinal axis, whereby in the first rotation position a first gap is formed between a first side of the fluid control element and the first inner surface of the casing wall, and the inner portion of the fluid control element is disposed behind the second contour element; and in the second rotation position a second gap is formed between a second side of the fluid control element and the second inner surface of the casing wall, and the inner portion of the fluid control element is disposed behind the first contour element. The fluid control element is also desirably configured to operate in a neutral central position whereby both the first gap and the second gap are open and the fluid exits equally from the first gap and the second gap.

The invention further includes a method for controlling directions of an aircraft. The method including the steps of: injecting fluid in a passage to a fluid control element including a Coanda surface, wherein the fluid extends around the Coanda surface to provide directional force; rotating the fluid control element to open a first gap between the fluid control element and a first surface of the passage, and placing a portion of the fluid control element behind a first blocking wall on an opposite second surface of the passage; directing the fluid to the first gap using the inner portion of the fluid control element; rotating the fluid control element to open a second gap between the fluid control element and the second surface of the passage, and placing the portion of the fluid control element behind a second blocking wall on the first surface of the passage; and directing the fluid to the second gap using the inner portion of the fluid control element. The fluid control element can further be operated in a neutral position whereby both the first gap and the second gap are open.

Other embodiments, objects, and advantages of the invention will be apparent to those skilled in the art from the following detailed description taken in conjunction with the appended claims and drawings.

DETAILED DESCRIPTION OF THE INVENTION

Unless defined otherwise, all technical and scientific terms used herein have the same meaning as commonly understood by one of ordinary skill in the art to which this invention belongs. As used in the specification and appended claims, unless specified to the contrary, the following terms have the meaning indicated. With regard to this specification, any time a definition of a term as defined herein, differs from a definition given for that same term in an incorporated reference, the definition explicitly defined herein is the correct definition of the term.

Coanda surfaces are surfaces that are configured for producing fluid flow exhibiting the Coanda effect. The Coanda effect relates to the tendency of a fluid to follow a surface. When properly configured, the fluid will follow or generally conform to a Coanda surface even as the surface curves away from the initial fluid flow direction.

The invention includes and provides systems and methods for controlling the directions of fluid with a movable Coanda surface. Exemplary applications of the invention include controlling the direction of moments produced on aircraft during flight. Embodiments of the invention can be further understood in the following detailed descriptions.

Figure 1A:
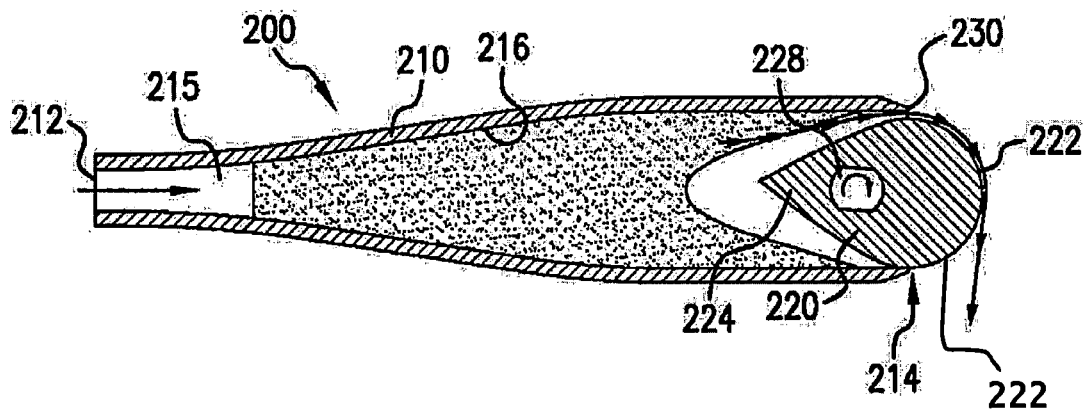
FIGS. 1A-1C shows a sectional side view of subsonic airflow flowing through a Coanda system according to one embodiment of this invention.
Figure 1B:
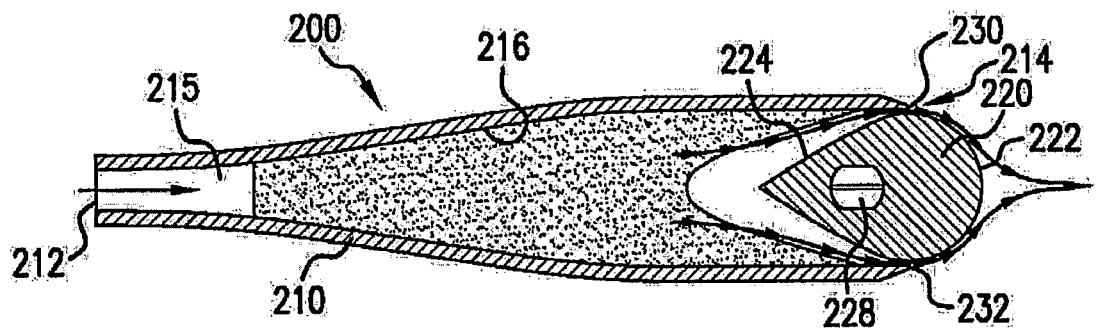
Figure 1C:
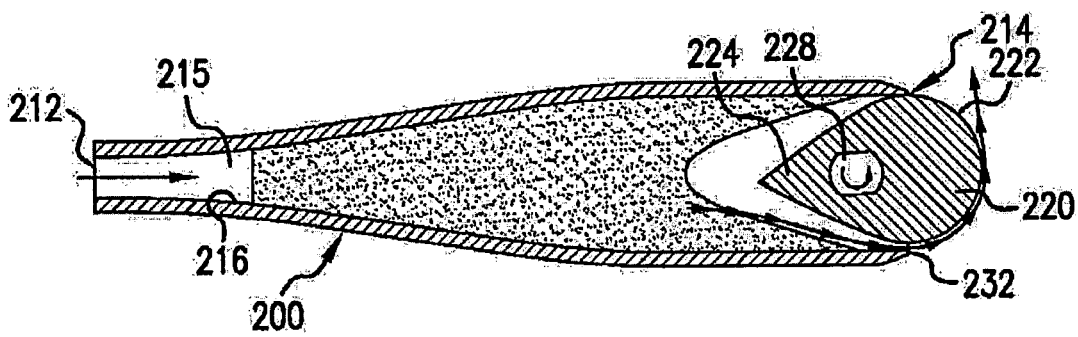

FIGS. 1A-1C shows a sectional side view of a subsonic airflow flowing through a Coanda valve system 200 according to one embodiment of this invention (with an example of Coanda surface design) under different conditions. FIG. 1A illustrates a net positive force generated when the Coanda surface is rotated clockwise. FIG. 1B illustrates a zero force generated when the Coanda surface is in a neutral position and not rotated. FIG. 1C illustrates a negative force generated when the Coanda surface is rotated counter-clockwise.

In each of FIGS. 1A-1C, air flows in a fluid passage 215 of a casing 210 from an inlet 212 to an outlet 214. A fluid control element 220 including a Coanda surface 222 is disposed at the outlet 214. The fluid control element further includes an inner portion 224, disposed facing the inlet 212, illustrated as a wedge-shaped extension. The fluid control element 220 is moveable within the second end outlet 214, about a pin 228, to direct the fluid exiting the fluid passage 215, as shown by arrows. The pin 228 is offset from the geometric centerline of the half cylinder, toward and/or within the wedge inner portion 224.

FIG. 1B shows the fluid control element 220 in a neutral position, where the air flows through both gap 230 and gap 232, on either side of the fluid control element 220 and between an inner wall 216 of the casing 210 and the fluid control element 220. Each partial flow extends around the Coanda surface 222 until the flows remerge into an outward flow. When the pin 228 is rotated clockwise (FIG. 1A), the gap 230 remains open, desirably opening wider, and gap 232 is closed. The air flows from the top gap 230 and follows the shape of the Coanda surface 222. This will result in a net positive force on the vertical axis. In FIG. 1C, the gap 232 is formed between the bottom inner wall of the casing 210 and the fluid control element 220 and the upper gap 230 is closed. The air flows from the bottom gap 232 and follows the shape of the Coanda surface 222 to result in a net negative force on the vertical axis.

Figure 2:
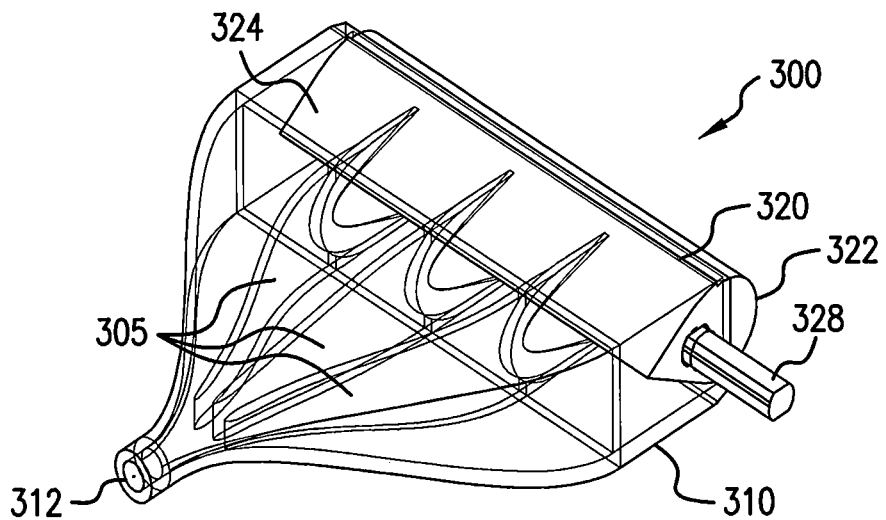
FIG. 2 shows a perspective view of a Coanda system according to one embodiment of the invention.
Figure 3:
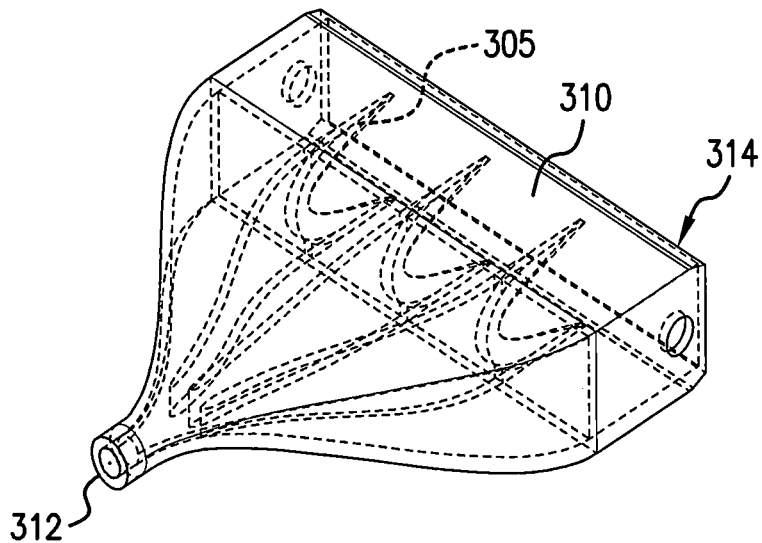
FIG. 3 shows a casing for the Coanda system of FIG. 2.
Figure 4:
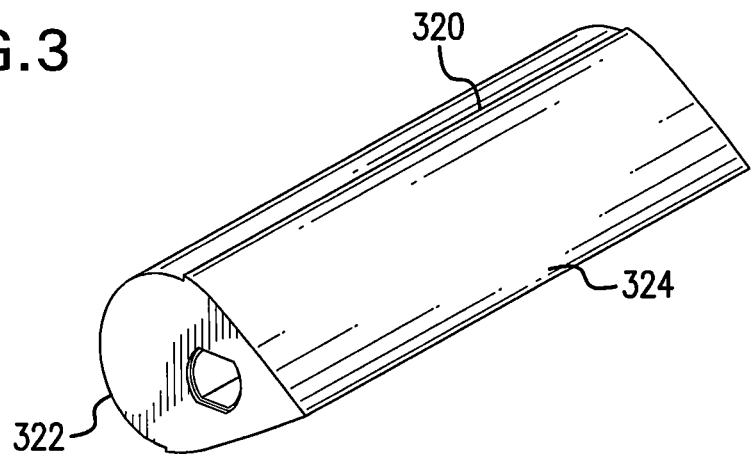
FIG. 4 shows a fluid control element of FIG. 2.

FIG. 2 shows an exemplary full assembly of a Coanda valve system 300 according to embodiments of the invention. The Coanda valve system 300 includes a casing 310 with inlet 312 and outlet 314 (shown separate in FIG. 3), a fluid control element 320 (shown separate in FIG. 4), and a pin 328 generally connecting the casing 310 and fluid control element 320 together. The casing 310 distributes a fluid (e.g., air or water) from the smallest inlet end to the largest cross-sectional area outlet end (inlet 312 to outlet 314). The fluid control element 320 includes an outer portion 322 and an inner portion 324. The outer portion 322 is or forms a Coanda surface as discussed above, and the inner portion 324 is inserted at the outlet 314 of the casing 310. The pin 328 is inserted through both the casing 310 and the fluid control element 322, and allows the fluid control element 322 to be rotated in different directions, such as discussed above.

The Coanda valve system 300 of FIG. 2 further includes several flow dividers 305 within the flow passage 315 of casing 310. The flow dividers 305 can assist in achieving desired, even flow. The flow dividers 305 include a U-shaped end towards the fluid control element 322, to receive therein the inner portion 324 and allow rotational movement thereof.

Figure 5A:
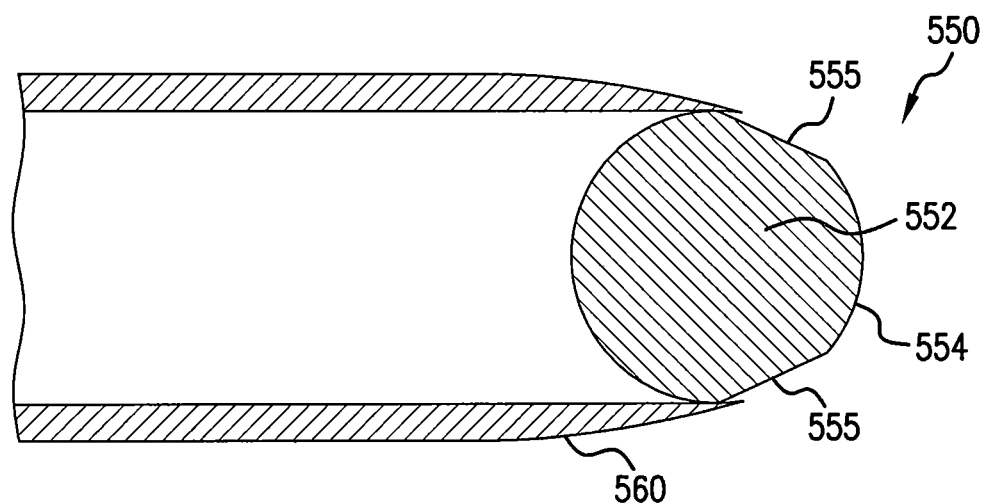
FIG. 5A is a schematic side view a Coanda fluid control element in neutral position and not rotated, according to one embodiment of the invention.
Figure 5B:
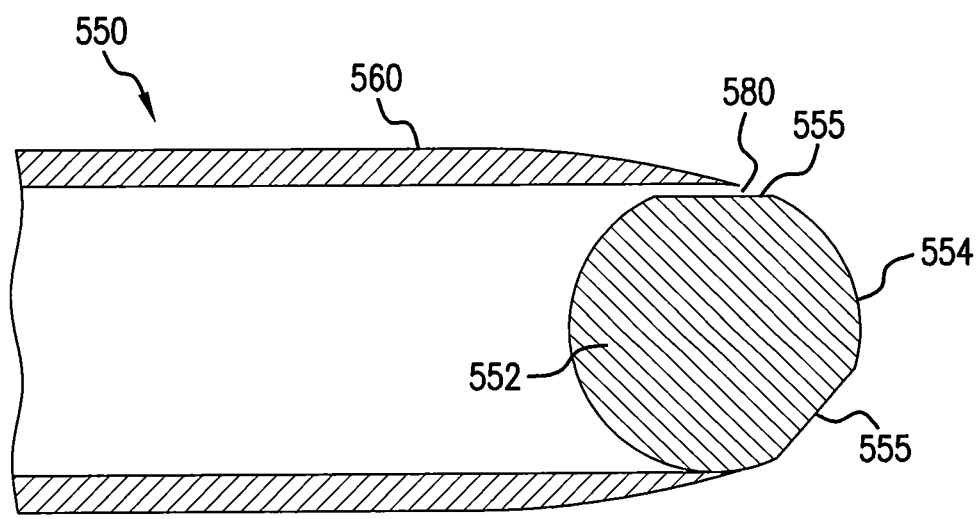
FIG. 5B is a schematic side view according of FIG. 5A, with the Coanda fluid control element rotated clockwise and the fluid exits from the top surface.

Embodiments of the invention provide asymmetric rotating of the Coanda surface as shown in FIGS. 5A and 5B. Coanda system 550 includes a fluid control element 552 embodied as a cylinder with two flat portions 555 on generally opposing sides of the tubular circumference. The fluid control element 552 is neutral in FIG. 5A and no gap exists between the fluid control element 552 and the casing 560 (i.e., the Coanda valve system 350 stays closed). In FIG. 5B, the fluid control element 552 is rotated clockwise and the fluid flow exits from the gap 580 formed between the top flat portion of the fluid control element 552 and the casing 560. The fluid exiting from the system goes downward along the Coanda surface 554 and produces a positive lift and a negative pitching moment when it is installed, for example, on the trailing edge of an aircraft wing. The flat portion gap configuration of FIGS. 5A-B can also be used with a wedge-configured inner portion, such as discussed herein.

Embodiments of this invention incorporate a casing plenum contour to reduce air flow leakage on the closed side of the Coanda element. The plenum contour desirably reduces high pressure regions at the closed side, thereby reducing leakage potential through the closed gap. The plenum contour can be or form a slot along one, and desirably both inner surfaces of the plenum. The plenum contour provides a ridge wall behind which an end of the Coanda element can fit to reduce the direct flow of air in the plenum against the intersection of the Coanda element and the casing plenum wall.

Figure 6A:
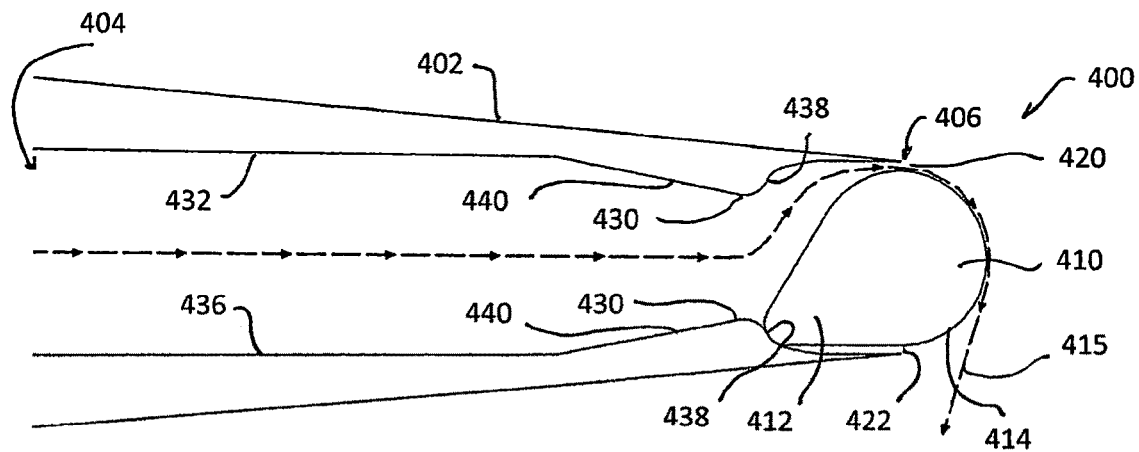
FIGS. 6A-6C show a Coanda system according to one embodiment of this invention.
Figure 6B:
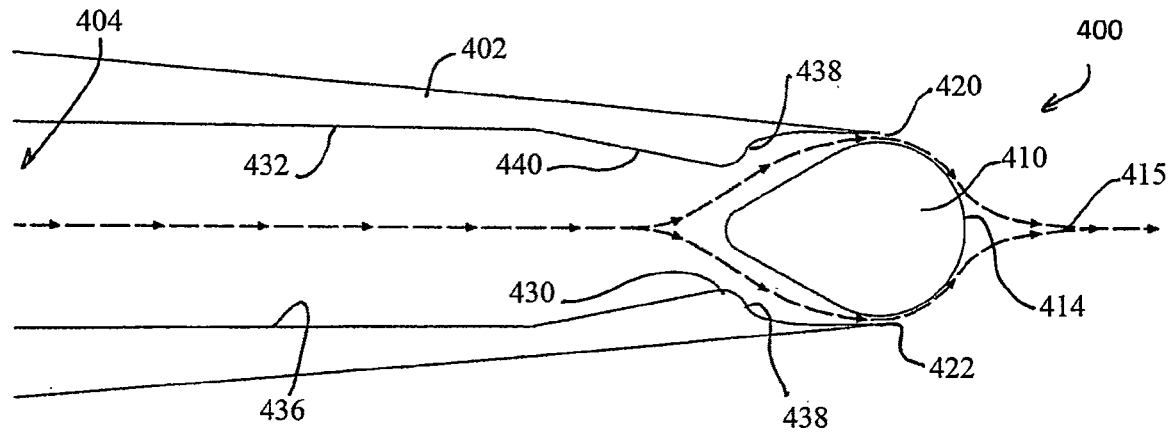
Figure 6C:
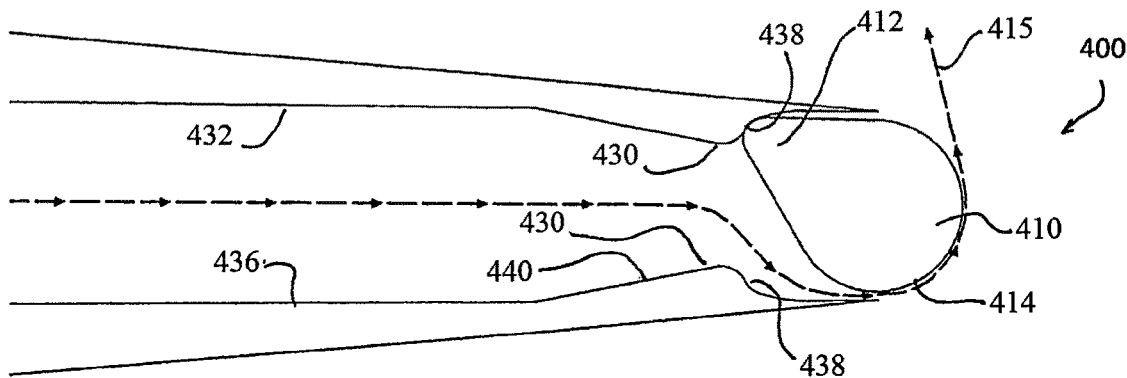

FIGS. 6A-6C show a Coanda valve system 400 according to embodiments of this invention. The Coanda valve system 400 includes a casing plenum 402 and a fluid control element 410. The plenum 402 diffuses and straightens the air flow from an inlet 404 to a rectangular outlet 406. The fluid control element 410 is disposed in the rectangular outlet 406. Two gaps, namely an upper gap 420 and a lower gap 422, are formed on opposing sides of the fluid control element 410. The gaps 420 and 422 can be sized and/or shaped by the fluid control element 410. The fluid control element 410 as shown can also close either gap as discussed above and/or by placing inner portion 412 against a corresponding inner plenum wall 432 or 436.

The plenum 402 includes a plenum contour 430 in or on the inner plenum wall 432. A second plenum contour 430 is desirably in or on the opposing inner plenum wall 434. Each plenum contour 430 forms a slot or blocking wall 438 into and/or behind which the inner portion 412 of the fluid control element 410 can be placed. The plenum contours 430 reduce leaks, such as by reducing high pressure areas against the closed gap. With straight plenum side walls a region of high pressure and stagnated flow forms in the plenum next to the closed section of the Coanda element. The high-pressure region creates a leakage flow under the fluid control element that interferes with the formation of the desirable Coanda flow exiting from the opposing gap. The plenum contour 430 acts to reduce or eliminate the high pressure area, such as by, without limitation, directing the flow away from the closed gap and/or otherwise protecting the closed gap from direct flow impingement.

Figure 7:
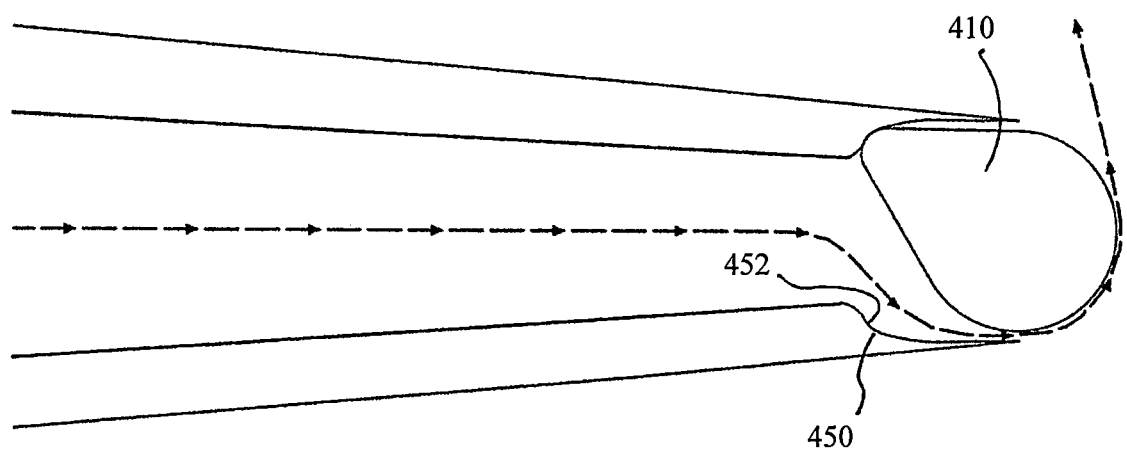
FIG. 7 shows a Coanda system according to one embodiment of this invention.

As illustrated, the two opposing plenum contours 430 form a reduction in the plenum 402. In addition, the plenum contours 430 include or form a ramp surface 440 that can work in concert with the inner portion 412 to direct the air flow to the open gap, as shown in FIGS. 6A and 6C. With this design the flow streamlines no longer form a stagnation point or high-pressure region on the closed side of the fluid control element. The result is a stronger and more reliable Coanda effect for the external flow 415 around the Coanda surface 414. The leakage flow can be virtually eliminated and the Coanda valve can be operated reliably at high pressures. As will be appreciated, various sizes, shapes, and configurations are available for the plenum contour, depending on need. For example, only one inner wall may include the plenum contour. In addition, the plenum contour may be a break wall 452 at a plenum widening 450 as shown in FIG. 7, or a slot or recess, in an otherwise straight plenum wall (i.e., no ramp surface).

Figure 8:
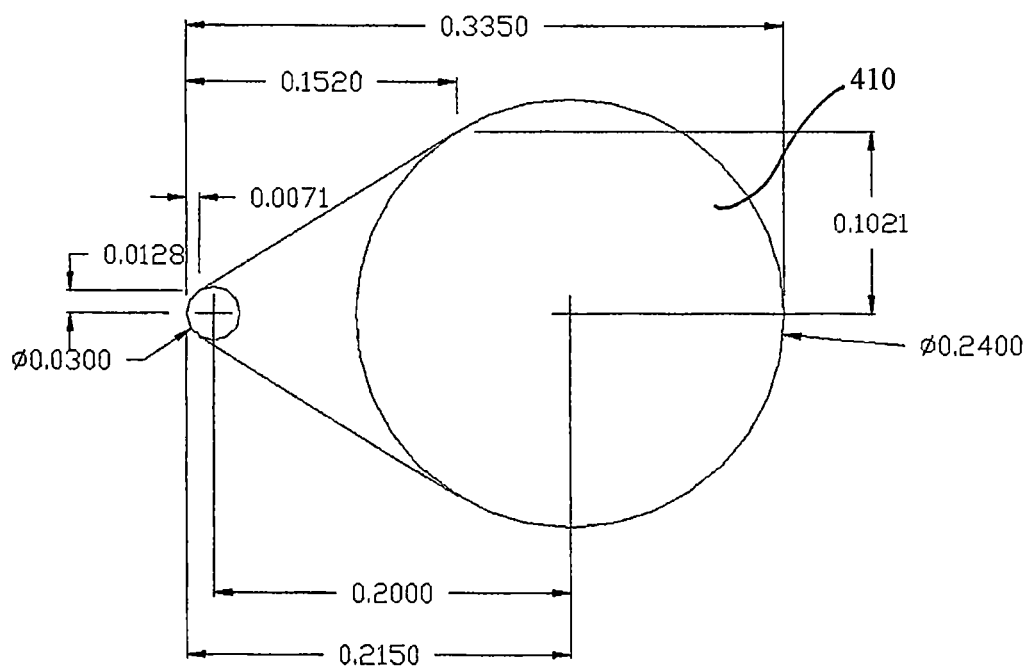
FIG. 8 shows a side schematic view of Coanda fluid control element according to one embodiment of this invention.

The cross section of the Coanda element 410 is formed by merging a half-circle shape with a shaped inner extension, such as a wedge having a pointed or rounded end. Exemplary dimensions for a fluid control element are shown, without limitation, in FIG. 8. Other sizes can be used. In embodiments of this invention, an important parameter in producing the Coanda effect is the size of the jet exit produced by the spacing between the outer plenum cover and the Coanda cylinder. The ratio of the jet exit height to the radius of the Coanda cylinder is desirably 0.05 to 0.10 for improved performance. The spanwise width of the overall Coanda valve device is desirably 7 inches.

Figure 9:
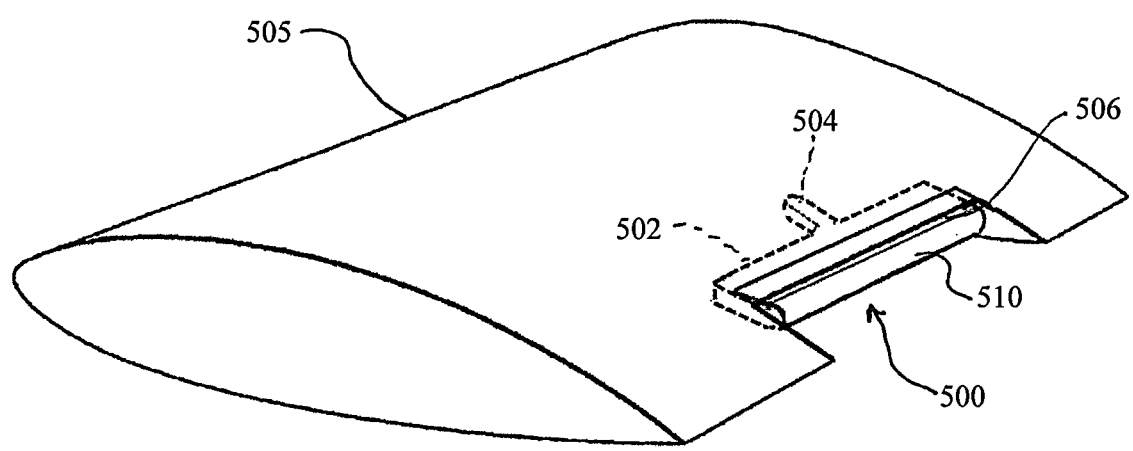
FIG. 9 shows an airplane wing with a Coanda system according to one embodiment of this invention.

FIG. 9 shows an exemplary aircraft wing 505 include a Coanda valve system 500, according to one embodiment of this invention, such as any described above The Coanda valve system 500 is incorporated at a rear or trailing edge of the wing 505, and includes a casing plenum 502 and a fluid control element 510. The plenum 502 diffuses and straightens air flow from an inlet 504 to a rectangular outlet 506. The fluid control element 510 is disposed in the rectangular outlet 506.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

Examples

Figure 10A:
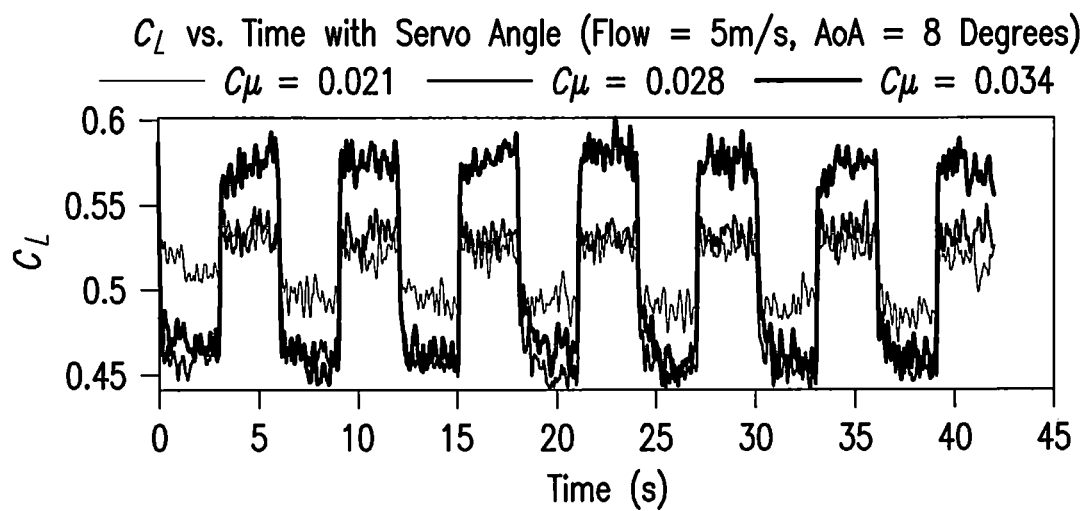
FIGS. 10A-10B show results from an experiment of a prototype according to one embodiment of the invention.
Figure 10B:
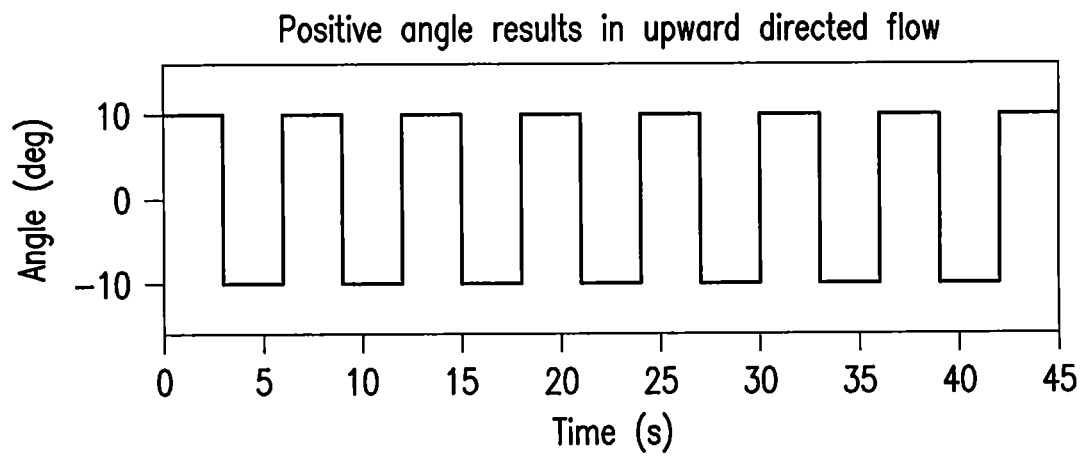

FIGS. 10A-10B show results from an experiment of a prototype according to one embodiment of the invention. A Coanda system according to this invention was installed in a symmetric wing of an aircraft, similar to that shown in FIG. 9, so that the flow around the wing and the wing's lift would be changed when the Coanda system was activated. A square wave input to the Coanda element changes the exiting flow angle between upward and downward blowing as shown in FIG. 10A. The measured lift coefficient changes as the flow angle changes, which can be seen in FIG. 10A. Three different flow rates were used, and the lift amplitude increased as the flow rate increased. The data demonstrated that the Coanda system is effective in changing the lift.

Figure 11:
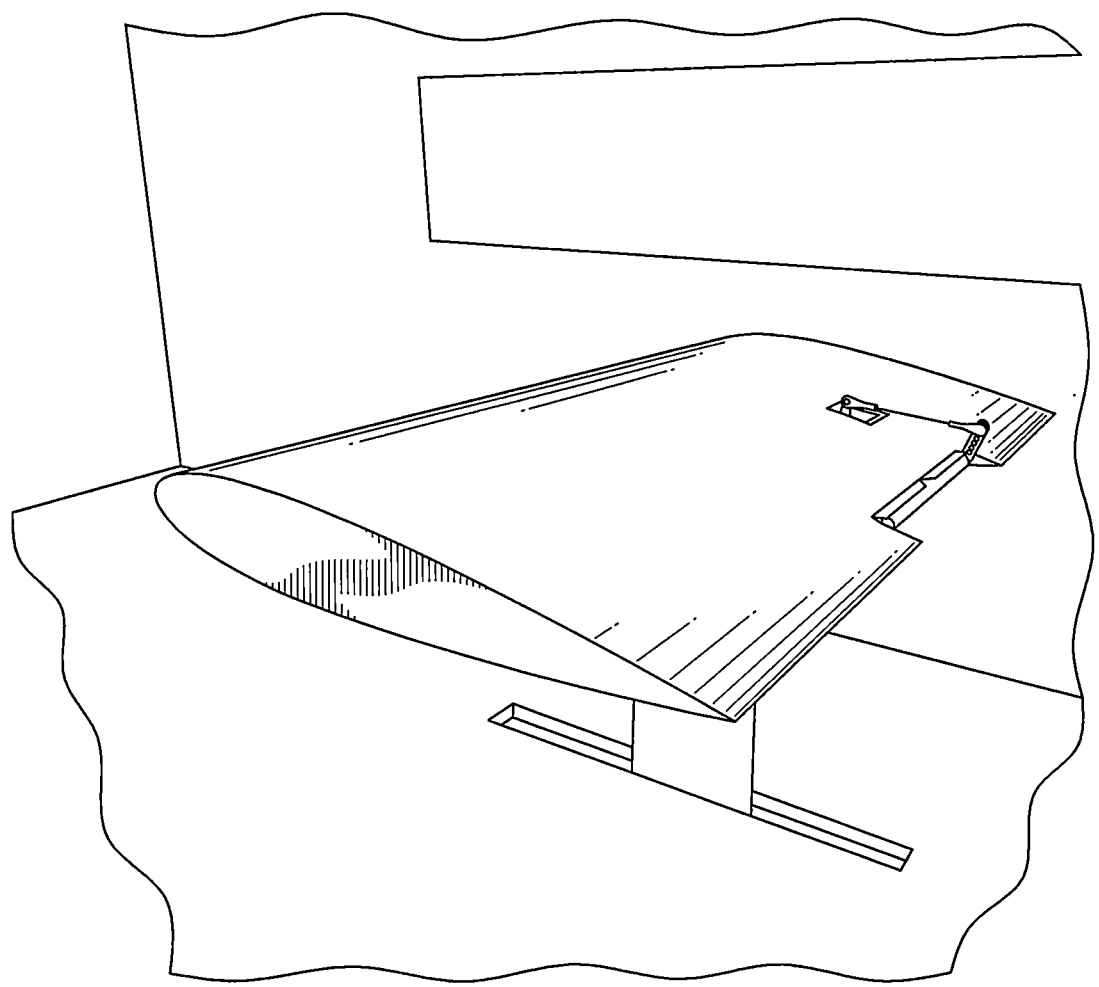
FIG. 11 shows an airplane wing with an exemplary Coanda system used in wind tunnel testing.

FIG. 11 shows another wing setup with a Coanda valve system having a plenum sidewall design similar to FIGS. 6A-6C. The valve was built and installed into the trailing-edge of a wing for testing in a wind tunnel. Objectives of this wind tunnel test included demonstrating that this design would work at high air supply pressures comparable to those required for aircraft applications, and to measure the lift, drag, and pitching moment control that would be achievable with the design. In addition to an increase in the aerodynamic forces, the design enabled a continuous variation in the forces as the Coanda cylinder was rotated from the fully downward position to the fully upward position. Earlier designs could not fully provide a continuous variation in forces, and operation was limited to being either fully upward blowing or fully downward blowing, which is known as a bang-bang type of control. A continuous variation in the forces is more desirable for flight control than the bang-bang type of control.

The wing was mounted on a force transducer in a wind tunnel test section as shown in FIG. 11. The airfoil was a NACA-0015 symmetric wing with a chord length of 320 mm and a span of 600 mm. The wind tunnel speed was 13.2 m/s. The span of the Coanda valve was 152 mm, which was 25% of the wingspan. Supply air mass flow rates of 4 grams/s and 8 grams/s were used. The angle of attack values tested were 0 degrees and 4 degrees. Air supply limitations in the wind tunnel laboratory limited the maximum flow rate to 8 grams/sec.

The general design of the Coanda valve is represented in FIGS. 6A-6C, where the flow is from left to right. The fluid control element was rotated to block the flow from exiting the lower surface and direct the flow over the top surface. In this configuration a positive lift force and negative pitching moment were produced.

Figure 12:
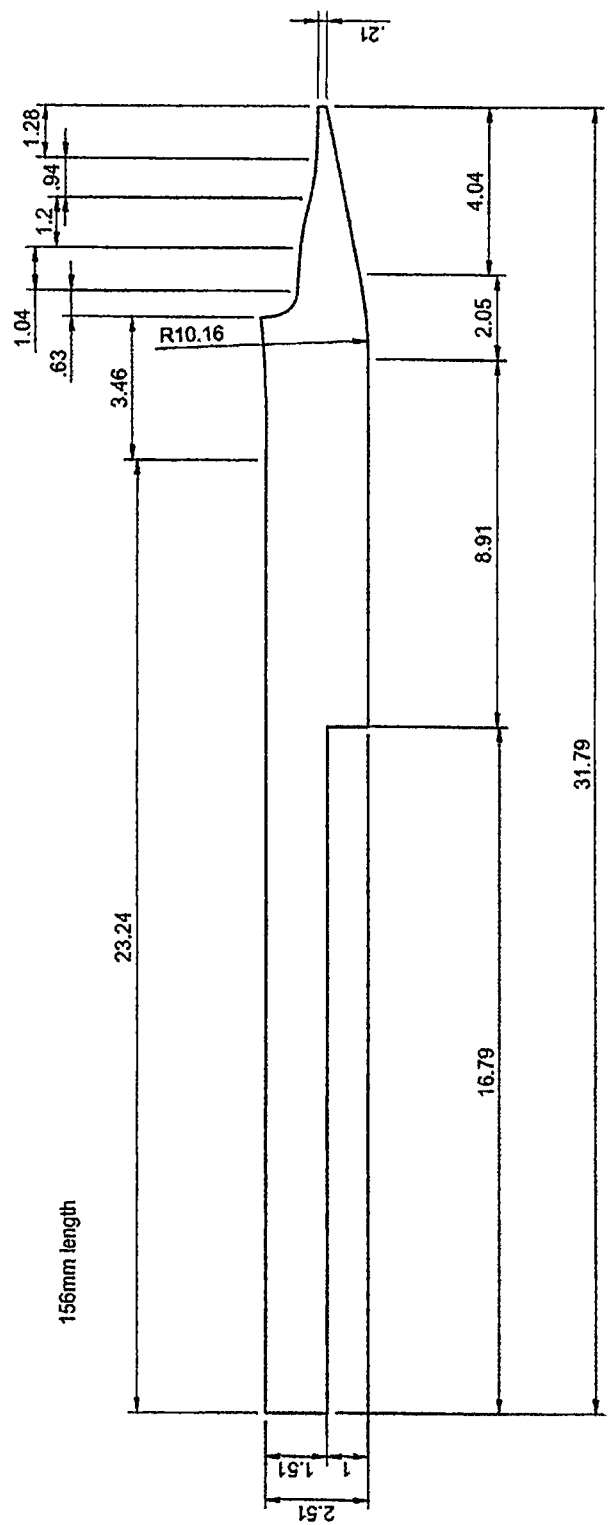
FIG. 12 shows a detailed schematic of the casing used in the example of FIG. 11.

A more accurate drawing with the detailed dimensions (mm) for the modified lower sidewall is shown in FIG. 12. The novel aspect of the design can be seen in the contour element of the surface on the right side where the Coanda cylinder fits into the design. The upper sidewall was the mirror image of the design shown here.

With no flow in the wind tunnel and no flow through the Coanda valve, the force balance measures the offset weight and moments acting on the wing. When there is no flow in the wind tunnel, but there is flow through the Coanda valve then the jet effect of the control effector was measured. These forces were subtracted from the wind-on case to get the force increment values.

An additional set of measurements was done with the Coanda valve outside of the wind tunnel, which demonstrated that the Coanda valve would maintain attached flow at least up to a pressure ratio 1.6 and a flow rate of 20 grams/s. Earlier designs without the contoured sidewalls would not produce a Coanda effect at this high pressure because of air flow leakage on the nominally closed side of the device.

Figure 13:
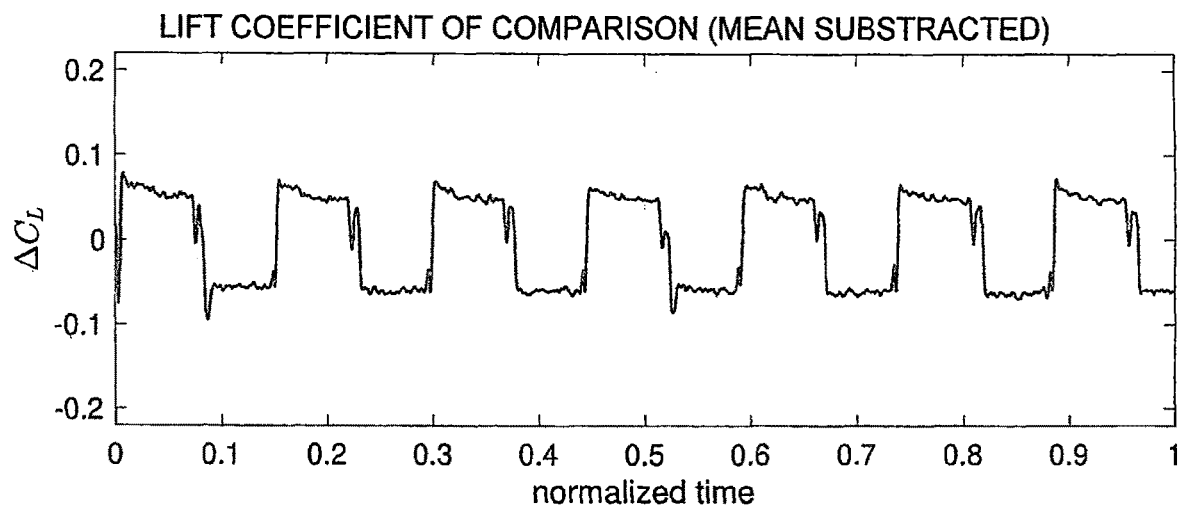
FIGS. 13-16 summarize results from an experiment of the airplane wing of FIG. 11.
Figure 14:
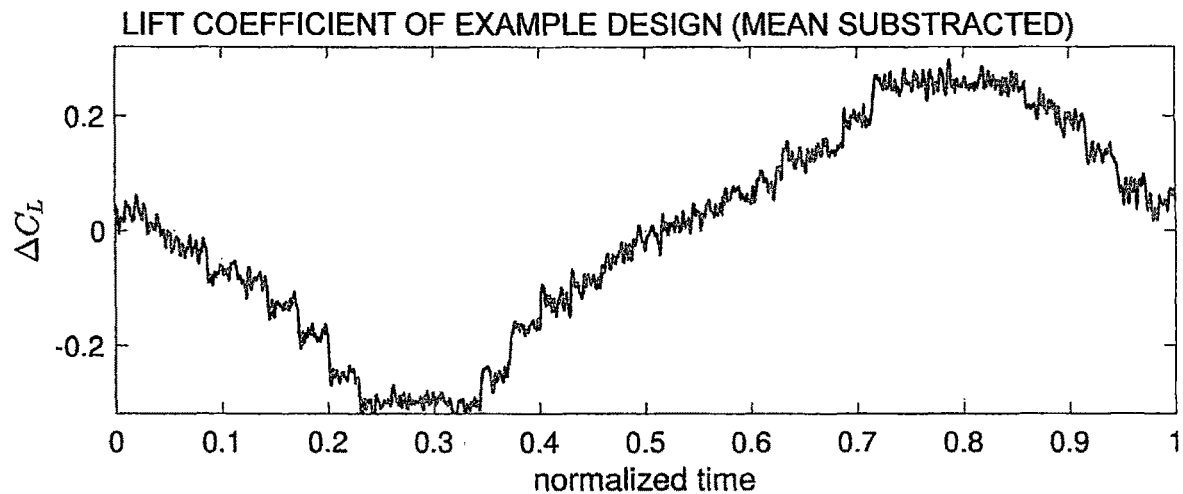

The lift coefficient increments of the modified sidewall design with the original straight sidewall design are compared in FIGS. 13 and 14. FIG. 13 shows 6 cycles of a comparison Coanda valve system without the contour element. The Coanda effect produced lift coefficient increments of approximately CL=+/−0.075. This comparison Coanda valve would not produce a stable lift coefficient between the positive/negative extremes, which is why this design is useful as a bang-bang type of control.

FIG. 14 shows the Coanda valve design of FIGS. 11 and 12 operating over a single cycle of the Coanda cylinder. This design produced stronger lift coefficient increments of approximately CL=+/−0.25, which are 3.3 times larger than the comparison design with straight side walls. The results also show that the contour element design is capable of producing stable intermediate lift increments, enabling a continuous variation in lift as the Coanda cylinder is rotated.

Figure 15:
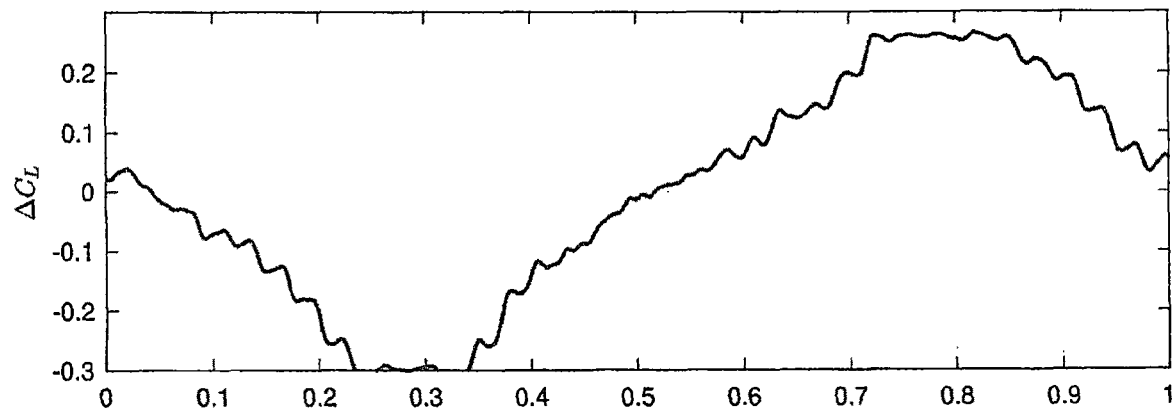
Figure 16:
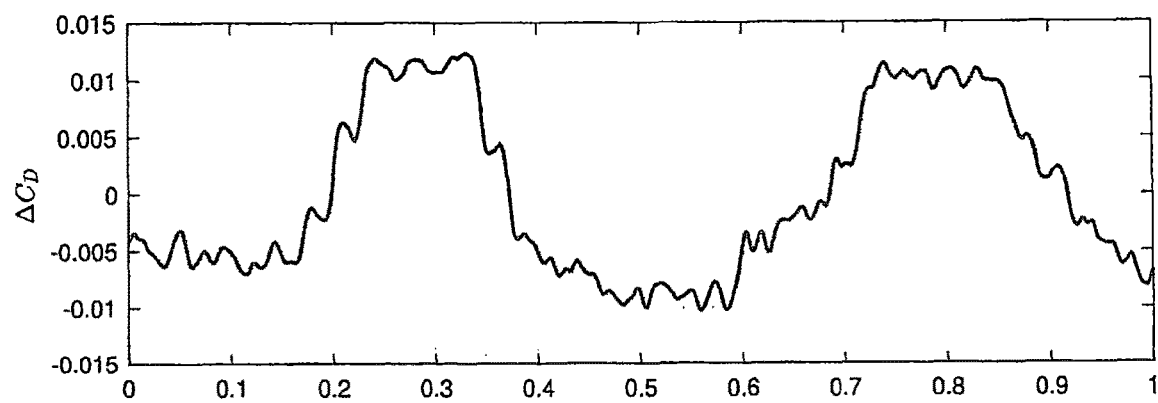

Continuous variation of the lift and drag coefficient increments for the example design during rotation of the Coanda cylinder are shown in FIGS. 15 and 16. When the Coanda cylinder is centered, so that the jet exits along the chord line of the wing, then the lift increment is near zero and the drag coefficient is minimized at Cd=−0.005. The negative sign on Cd indicates the Coanda valve is reducing drag on the wing. The reduced drag can be seen to occur between times $0<t<0.2$, $0.375<t<0.68$, and $0.92<t<1.0$. When the Coanda cylinder is rotated to create a positive or negative lift increment that exceeds +/−0.15 then the drag increment is increased. This behavior is consistent with the lift induced drag that occurs on all wings.

Reduced drag regions have practical importance to the commercial aircraft industry. If the Coanda valve is used as replacement to flaperons for flight control during cruise conditions, then they would also serve to reduce the drag on the aircraft. A one percent drag reduction for the airline industry can translate into significant fuel cost savings.

Thus the invention provides an improved Coanda system for use in aircraft or other devices. The Coanda system of the invention reduces leakage and provides for increased usefulness.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the future claims. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A Coanda valve system for controlling directions of an aircraft, comprising:
   a fluid passage defined in part by casing walls having inner surfaces facing the fluid passage, the fluid passage configured to pass fluid from a first end inlet to a second end outlet;
   a fluid control element including a Coanda surface disposed at the second end outlet, the fluid control element moveable within the second end outlet to direct the fluid exiting the fluid passage, wherein the fluid control element includes an inner extension portion within the fluid passage and facing the first end inlet;
   a first outlet gap formed between a first side of the fluid control element and a first inner surface of the casing walls;

a second outlet gap formed between a second side of the fluid control element and a second inner surface of the casing walls; and a contour element disposed on the first inner surface of the casing wall upstream of the fluid control element, the contour element forming a blocking wall facing the fluid control element and the first outlet gap, wherein the inner extension portion is moveable to position an end of the inner extension portion behind the blocking wall to close the first outlet gap.

2. The system of claim 1, wherein the contour element is configured to work in combination with the inner extension portion of the fluid control element to direct the fluid over the Coanda surface.

3. The system of claim 1, wherein the blocking wall extends from the inner surface into the fluid passage between a first diameter of the fluid passage and a greater second diameter of the fluid passage.

4. The system of claim 1, wherein the contour element extends into the fluid passage and narrows a diameter of the fluid passage.

5. The system of claim 4, wherein the contour element comprises a sloped surface facing the first end inlet.

6. The system of claim 1, further comprising a second contour element disposed on an opposite side of the fluid passage from the contour element.

7. The system of claim 1, further comprising:
a rotation mechanism connected to the fluid control element and configured to rotate the fluid control element about a longitudinal axis, whereby in a first rotational position the first outlet gap is open between a first side of the fluid control element and the first inner surface of the casing walls, and in a second rotational position the second outlet gap is open between a second side of the fluid control element and the second inner surface of the casing walls.

8. The system of claim 7, wherein the fluid control element is configured to operate in a position whereby both the first outlet gap and the second outlet gap are open and the fluid exits from each of the first outlet gap and the second outlet gap.

9. The system of claim 1, wherein the fluid control element is positioned at a trailing edge of an aircraft wing.

10. The system of claim 1, further comprising a second blocking wall facing the fluid control element and the second outlet gap, wherein the inner extension portion is moveable to position the end of the inner extension portion behind the blocking wall to close the second outlet gap.

11. The system of claim 10, wherein the first outlet gap is an upper gap above the contour element, and the second outlet gap is a lower gap below the contour element, wherein a position of the end of the inner extension portion behind the blocking wall closes the upper gap and directs the fluid from the fluid passage out through only the lower gap.

12. A Coanda valve system for controlling the directions of an aircraft, comprising:
a casing defining a fluid passage configured to pass fluid from a first end inlet of the casing to a second end outlet of the casing, the casing including a first inner surface on a first side of the fluid passage and a second inner surface on a second side of the fluid passage;
a fluid control element extending across the second end outlet of the casing and moveable within the second end outlet to direct the fluid exiting the fluid passage, the fluid control element including a Coanda surface at the second end outlet, and an inner portion extension within the fluid passage and facing the first end inlet;
a first outlet gap formed between a first side of the fluid control element and the first inner surface of the casing wall;
a second outlet gap formed between a second side of the fluid control element and the second inner surface of the casing wall;
a first contour element disposed on the first inner surface of the casing, upstream of the fluid control element;
a second contour element disposed on the second inner surface of the casing, upstream of the fluid control element and opposite the first contour element;
wherein the fluid control element is rotatable within the second end outlet between a first position and a second position, wherein in the first position the inner portion of the fluid control element is disposed downstream of the first contour element to close the first outlet gap, and in the second position the inner portion of the fluid control element is disposed downstream of the second contour element to close the second outlet gap.

13. The system of claim 12, wherein each of the first and second contour elements comprises a blocking wall facing the fluid control element, and the inner portion extension is moveable to position an end of the inner portion extension behind the blocking wall.

14. The system of claim 12, wherein each of the first and second contour elements extends into the fluid passage, and each includes a sloped surface facing the first end inlet.

15. The system of claim 14, wherein each of the first and second contour elements comprises a blocking wall facing the fluid control element, and the inner portion extension is moveable to position an end behind the blocking wall.

16. The system of claim 12, further comprising:
a rotation mechanism connected to the fluid control element and configured to rotate the fluid control element about a longitudinal axis, whereby:
in the first rotation position the first outlet gap is open between a first side of the fluid control element and the first inner surface of the casing wall, and the inner portion of the fluid control element is disposed behind the second contour element; and
in the second rotation position the second outlet gap is open between a second side of the fluid control element and the second inner surface of the casing wall, and the inner portion of the fluid control element is disposed behind the first contour element.

17. The system of claim 16, wherein the fluid control element is configured to operate in a position whereby both the first outlet gap and the second outlet gap are open and the fluid exits from both the first outlet gap and the second outlet gap.

18. The system of claim 12, wherein the fluid control element is positioned at a trailing edge of an aircraft wing.

19. A method for controlling directions of an aircraft, the method comprising the steps of:
injecting fluid in a passage to a fluid control element including a Coanda surface, wherein the fluid extends around the Coanda surface to provide directional force;
rotating the fluid control element to open a first gap between the fluid control element and a first surface of the passage, and placing an inner portion of the fluid control element behind a first blocking wall on an opposite second surface of the passage;
directing the fluid to the first gap using the inner portion of the fluid control element;
rotating the fluid control element to open a second gap between the fluid control element and the second surface of the passage, and placing the portion of the fluid control element behind a second blocking wall on the first surface of the passage; and directing the fluid to the second gap by closing the first gap with the inner portion of the fluid control element.

20. The method of claim 19, further comprising operating the fluid control element in a neutral position whereby both the first gap and the second gap are open.

\* \* \* \* \*